(No Model.)

V. L. De MOW.
Portable Fence.

No. 237,097. Patented Feb. 1, 1881.

Witnesses
George F. Robinson
Jessie A. Horton

Inventor
Vincent L. De Mow
by Bradford Howland
his attorney

UNITED STATES PATENT OFFICE.

VINCENT L. DE MOW, OF SHALERSVILLE, OHIO.

PORTABLE FENCE.

SPECIFICATION forming part of Letters Patent No. 237,097, dated February 1, 1881.

Application filed October 29, 1880. (No model.)

*To all whom it may concern:*

Be it known that I, VINCENT L. DE MOW, of Shalersville, Portage county, Ohio, have invented a new and useful Improvement in Portable Fences, of which the following is a specification.

The nature of my invention is a fence composed of sections connected with each other by a hook and staple, and each section being provided with a pivoted brace on each side, fastened to the ground by a pin, the braces on opposite sides being of unequal length, and the posts being sharpened or provided with pins at the lower ends to enter the ground.

Figure 1:
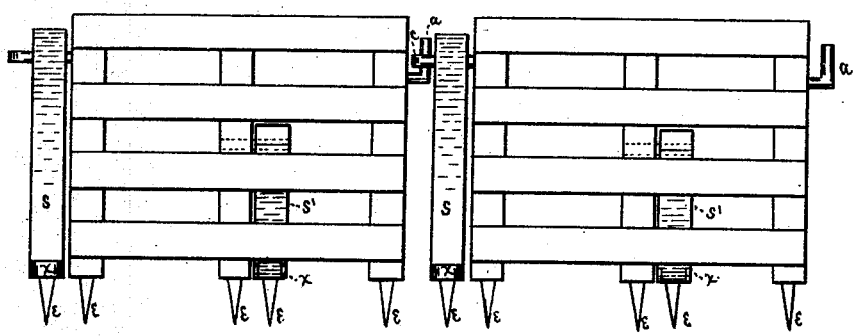
Figure 2:
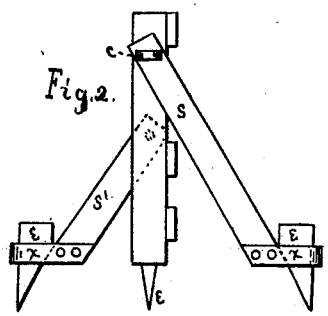

In the drawings, Figure 1 is a side elevation, representing two sections of the fence. Fig. 2 is an end elevation.

Each section is constructed of boards and posts, the posts being pointed for the purpose of being driven into the ground. At one end of the section, near the top, the pin $a$ projects from the post, and is bent upward, forming in connection with staple $c$, similarly situated in the end post of the adjoining section, a hinge, as shown in Fig. 1. Each section is provided with pin $a$ at one end, and staple $c$ at the other, by means of which the consecutive sections of the fence are hinged or connected with each other.

The fence is braced laterally by braces $s\ s'$, which are pivoted to posts at the upper end, and provided with U-shaped irons or loops $x$ at the lower end, pinned to the brace, through which they are fastened to the ground by stakes or pins $e$. Brace $s$ is on one side of the section, and brace $s'$ on the opposite side. These two braces are of unequal length, for the purpose of more firmly supporting the fence laterally. The shank of staple $c$ is used as a pivot for the upper end of the long brace $s$.

By reason of the braces $s\ s'$ being pivoted to the posts they can be turned to bring their lower ends in contact with uneven ground.

In moving my portable fence by sections the braces may be folded or turned on their pivots till in line with the posts, and thus be changed into a convenient form for transportation.

I claim as my invention—

1. A portable fence consisting of sections, each of which is provided with pin $a$ at one end and staple $c$ and brace $s$ at the other end, the brace being pivoted on the shank of the staple, and the sections, hinged together by the pin and staple, being detachable from each other without removing either the pin, staple, or brace from the section, substantially as described.

2. A portable fence consisting of sections, each of which is provided with pin $a$ at one end and staple $c$ at the other end, and with a long brace, $s$, on one side of the section, pivoted to an end post, and a short brace, $s'$, pivoted to another post of the section, both braces being provided with loops $x$, attached to their lower ends, for the purpose of fastening the braces to the ground by pins $e$, substantially as described.

VINCENT L. DE MOW.

Witnesses:
BRADFORD HOWLAND,
SIDNEY O. CROSBY.